US010141987B2

(12) United States Patent
Kim et al.

(10) Patent No.: US 10,141,987 B2
(45) Date of Patent: Nov. 27, 2018

(54) METHOD FOR FEEDING BACK REFERENCE SIGNAL INFORMATION IN MULTI-ANTENNA WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Kijun Kim, Seoul (KR); Yunjung Yi, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/569,613

(22) PCT Filed: May 12, 2016

(86) PCT No.: PCT/KR2016/005031
§ 371 (c)(1),
(2) Date: Oct. 26, 2017

(87) PCT Pub. No.: WO2016/186378
PCT Pub. Date: Nov. 24, 2016

(65) Prior Publication Data
US 2018/0097548 A1 Apr. 5, 2018

Related U.S. Application Data

(60) Provisional application No. 62/161,914, filed on May 15, 2015.

(51) Int. Cl.
*H04L 1/02* (2006.01)
*H04B 7/0417* (2017.01)
(Continued)

(52) U.S. Cl.
CPC .............. *H04B 7/0417* (2013.01); *H04B 7/04* (2013.01); *H04B 7/0478* (2013.01); *H04B 7/06* (2013.01); *H04B 7/0626* (2013.01); *H04L 5/00* (2013.01)

(58) Field of Classification Search
CPC .................................................. H04B 7/0626
(Continued)

(56) References Cited

U.S. PATENT DOCUMENTS 4,277,755 A * 7/1981 Fausone ............. H05B 33/0851
330/128
4,317,210 A * 2/1982 Dekker ............... H04L 27/2332
329/321
(Continued)

FOREIGN PATENT DOCUMENTS

WO    WO 2014/003506 A1    1/2014

*Primary Examiner* — Helene Tayong
(74) *Attorney, Agent, or Firm* — Birch, Stewart, Kolasch & Birch, LLP

(57) ABSTRACT

The present invention relates to a method and apparatus for feeding back, by a terminal, reference signal information in wireless communication using a two-dimensional active antenna system including a plurality of antennas. Particularly, the method for feeding back reference signal information comprises the steps of: receiving, from a base station, a reference signal configuration including identifiers of a plurality of reference signals having a first reference signal set and a second reference signal set; receiving the plurality of reference signals to which the precoding is applied; measuring reference signal received power (RSRP) for each of the plurality of reference signals; and transmitting, to the base station, information on at least a part of the first reference signal set and information on at least a part of the second reference signal set, on the basis of the measured RSRP. In addition, the precoding for the terminal is determined on the basis of the information on at least a part of the (Continued)

first reference signal set, and the interference information for the terminal can be determined on the basis of the information on at least a part of the second reference signal set.

11 Claims, 13 Drawing Sheets

(51) Int. Cl.
- *H04B 7/04* (2017.01)
- *H04B 7/06* (2006.01)
- *H04L 5/00* (2006.01)
- *H04B 7/0456* (2017.01)

(58) Field of Classification Search
USPC .......................................................... 375/267
See application file for complete search history.

(56) References Cited

U.S. PATENT DOCUMENTS

| | | |
|---|---|---|
| 2013/0053077 A1 | 2/2013 | Barbieri et al. |
| 2014/0177601 A1 | 6/2014 | Nishio et al. |
| 2014/0198683 A1 | 7/2014 | Ihm et al. |
| 2014/0341048 A1 | 11/2014 | Sajadieh et al. |

* cited by examiner

FIG. 3
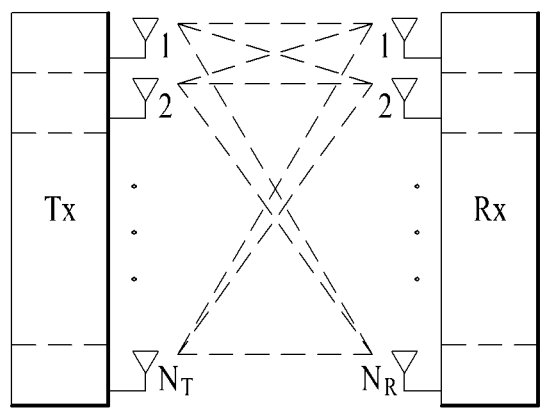
(a)
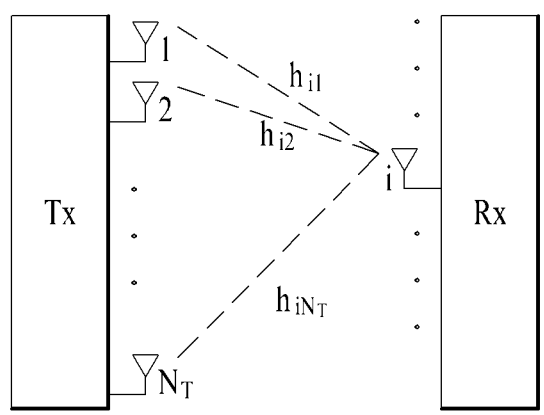
(b)

FIG. 4
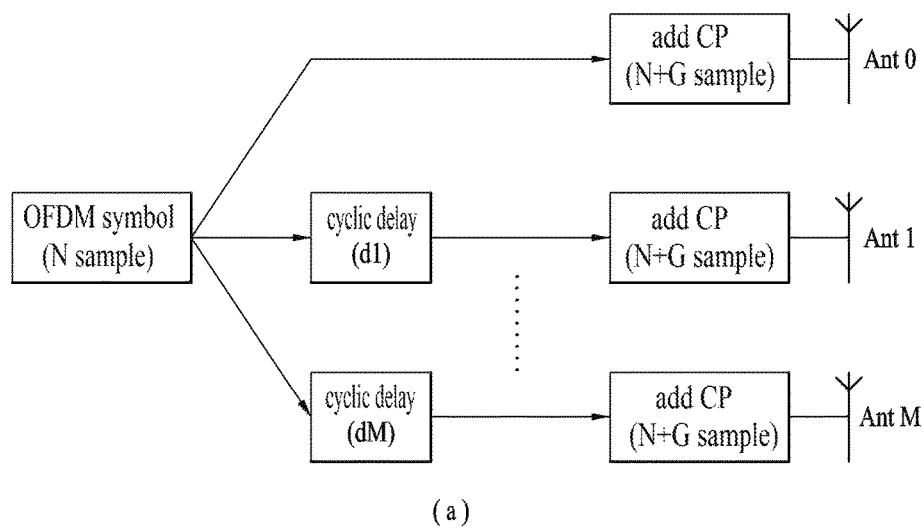
(a)
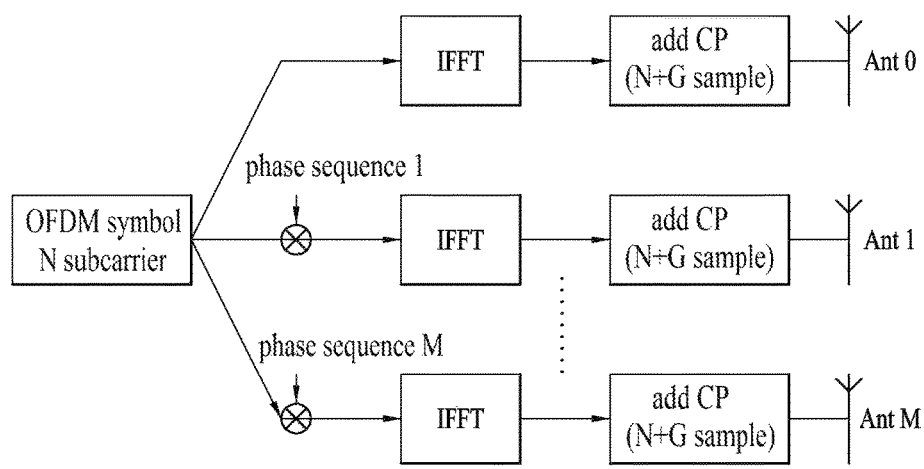
(b)

METHOD FOR FEEDING BACK REFERENCE SIGNAL INFORMATION IN MULTI-ANTENNA WIRELESS COMMUNICATION SYSTEM AND APPARATUS THEREFOR

CROSS REFERENCE TO RELATED APPLICATIONS

This application is the National Phase of PCT International Application No. PCT/KR2016/005031, filed on May 12, 2016, which claims priority under 35 U.S.C. 119(e) to U.S. Provisional Application No. 62/161,914, filed on May 15, 2015, all of which are hereby expressly incorporated by reference into the present application.

TECHNICAL FIELD

The present invention relates to a wireless communication system, and more particularly, to a method for feeding back reference signal information in a multi-antenna wireless communication system and apparatus therefor.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas. DRS based data demodulation has been considered for effectively managing RSs and supporting a developed transmission scheme. That is, for supporting data transmission through extended antennas. DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE OF THE INVENTION

Technical Task

The technical task of the present invention is to provide a method for feeding back reference signal information in a wireless communication system and apparatus therefor It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a method for feeding back reference signal information by a user equipment (UE) in wireless communication using a two-dimensional active antenna system (2D-AAS) including multiple antennas, including: receiving, from a base station (BS), a reference signal configuration including identifiers (IDs) of a plurality of reference signals included in a first reference signal set and a second reference signal set; receiving the plurality of reference signals where precoding is applied; measuring reference signal received power (RSRP) for each of the plurality of reference signals; and transmitting, to the BS, information on at least part of the first reference signal set and information on at least part of the second reference signal set based on the measured RSRP. In this case, precoding for the UE may be determined based on the information on the at least part of the first reference signal set, and interference information on the UE may be determined based on the information on the at least part of the second reference signal set.

Additionally, the first reference signal set may be composed of reference signals of the BS, and the second reference signal set may be composed of reference signals of a neighboring BS adjacent to the BS.

Additionally, different precoding may be applied to each of the reference signals in the first reference signal set such that each of the reference signals in the first reference signal set has a different incidence angle in a vertical direction.

Additionally, the information on the at least part of the first reference signal set may include an ID(s) of at least one reference signal having RSRP equal to or greater than a first threshold value in the first reference signal set, and the information on the at least part of the second reference signal set may include an ID(s) of at least one reference signal having RSRP equal to or greater than a second threshold value in the second reference signal set.

Additionally, the information on the at least part of the first reference signal set may further include RSRP for the at least one reference signal having the RSRP equal to or greater than the first threshold value in the first reference signal set, and the information on the at least part of the second reference signal set may further include RSRP for the at least one reference signal having the RSRP equal to or greater than the second threshold value in the second reference signal set.

Additionally, the information on the at least part of the first reference signal set may include an ID(s) of at least one reference signal having RSRP equal to or greater than a first threshold value in the first reference signal set, and the information on the at least part of the second reference signal set may include an ID(s) of at least one reference signal having RSRP equal to or greater than a second threshold value in the second reference signal set.

Additionally, a time period for measuring RSRP for each of a plurality of reference signals in the first reference signal set may be set to be longer than that for measuring RSRP for each of a plurality of reference signals in the second reference signal set.

Additionally, the method may further include: determining a reference signal that is not successfully received based on the reference signal configuration; and transmitting an ID of the determined reference signal, which is not successfully received, to the BS.

In another aspect of the present invention, provided herein is a user equipment (UE) in wireless communication using a two-dimensional active antenna system (2D-AAS) including multiple antennas, including: a transceiver configured to transmit and receive signals; and a processor configured to control the transceiver, wherein the processor is further configured to: receive, from a base station (BS), a reference signal configuration including identifiers (IDs) of a plurality of reference signals included in a first reference signal set and a second reference signal set; receive the plurality of reference signals where a plurality of pieces of precoding is applied respectively; measure reference signal received power (RSRP) for each of the plurality of reference signals; and transmit, to the BS, information on at least part of the first reference signal set and information on at least part of the second reference signal set based on the measured RSRP. In this case, precoding for the UE may be determined based on the information on the at least part of the first reference signal set, and interference information on the UE may be determined based on the information on the at least part of the second reference signal set.

Advantageous Effects

According to embodiments of the present invention, it is possible to provide an efficient method for feeding back a reference signal in a multi-antenna system and apparatus therefor.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention:

FIG. 3 is a diagram for a configuration of a general MIMO communication system;

FIG. 4 is a diagram for an example of a general CDD structure in a MIMO system;

BEST MODE FOR INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following detailed description is given under the assumption that 3GPP LTE mobile communication systems are used. However, the description may be applied to any other mobile communication system except for specific features inherent to the 3GPP LTE systems.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a terminal refers to a mobile or fixed type user equipment such as a user equipment (UE), and an advanced mobile station (AMS). Also, it is assumed that a base station refers to a random node of a network terminal, such as Node B, eNode B, and an access point (AP), which performs communication with the user equipment.

In a mobile communication system, a user equipment may receive information from a base station through a downlink and transmit information to the base station through an uplink. The information that the user equipment transmits or receives includes data and various types of control information. There are various physical channels according to the types and usages of information that the user equipment transmits or receives.

As an example of a mobile communication system to which the present invention is applicable, a 3rd Generation Partnership Project Long Term Evolution (hereinafter, referred to as LTE) communication system is described in brief.

Figure 1:
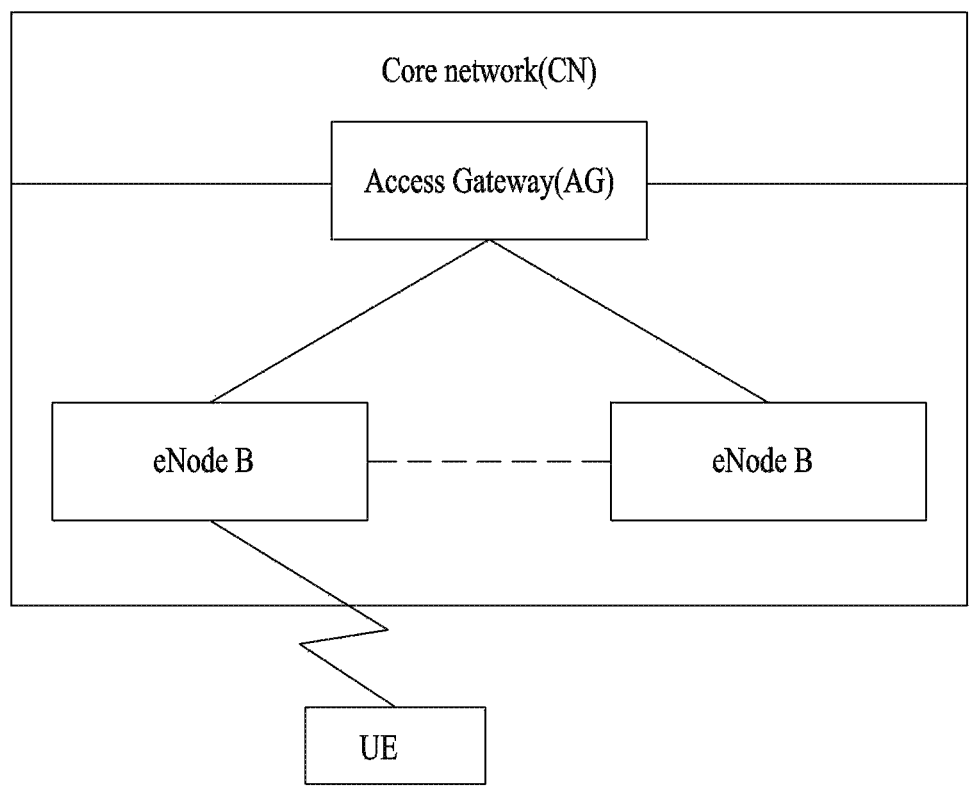
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system.

An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information.

In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Recently, 3GPP has standardized technology subsequent to LTE. In this specification, the technology will be referred to as "LTE-Advanced" or "LTE-A". A main difference between the LTE system and the LTE-A system is a system bandwidth. The LTE-A system aims to support a wideband of up to 100 MHz. To achieve this, the LTE-A system employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in the LTE system. Each frequency block is transmitted using a component carrier.

Figure 2:
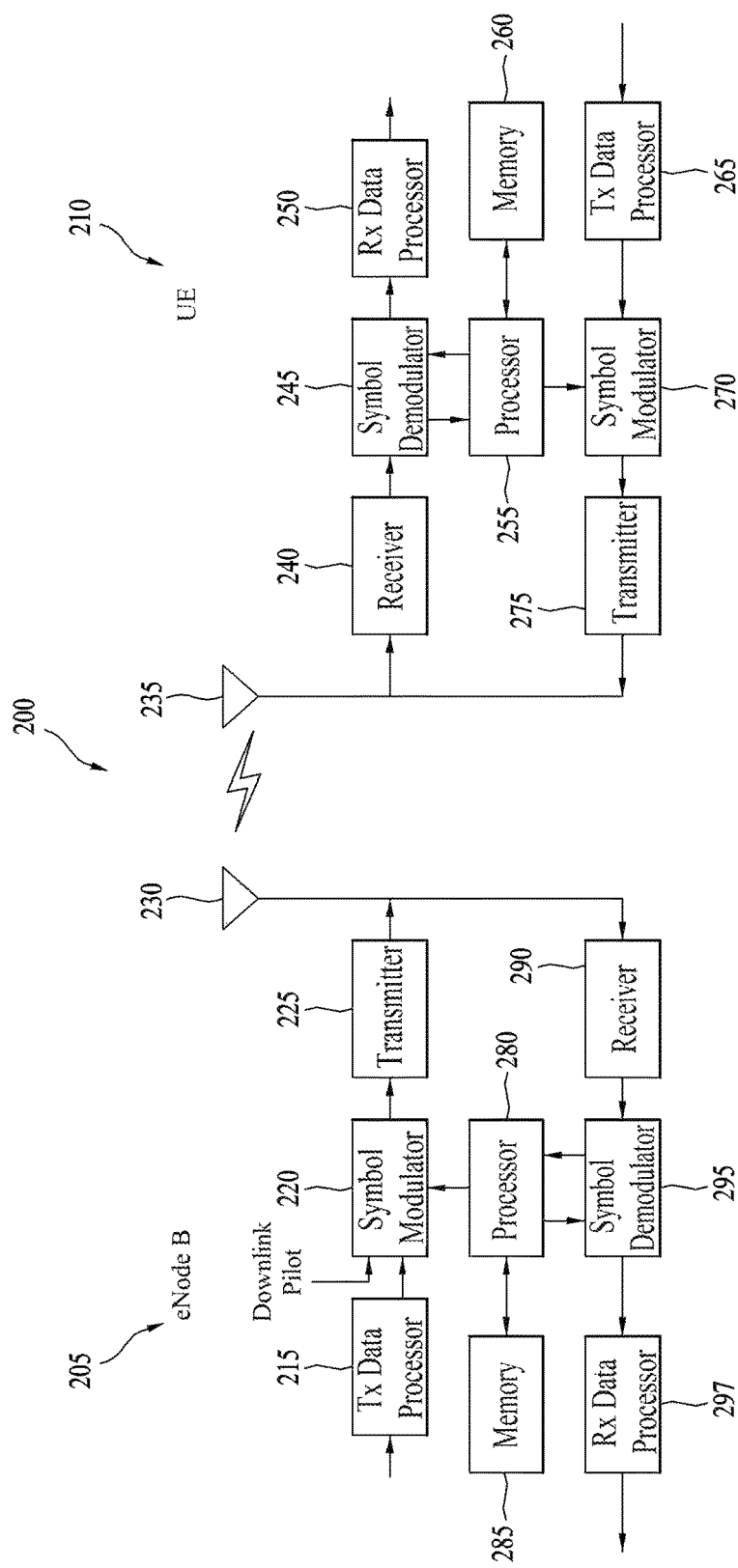
FIG. 2 is a block diagram illustrating configurations of a base station 205 and a user equipment 210 in a wireless communication system 200 according to the present invention.

FIG. 2 is a block diagram illustrating configurations of a base station 205 and a user equipment 210 in a wireless communication system 200.

Although one base station 205 and one user equipment 210 are shown for simplification of a wireless communication system 200, the wireless communication system 200 may include one or more base stations and/or one or more user equipments.

Referring to FIG. 2, the base station 105 may include a transmitting (Tx) data processor 215, a symbol modulator 220, a transmitter 225, a transmitting and receiving antenna 230, a processor 280, a memory 285, a receiver 290, a symbol demodulator 295, and a receiving (Rx) data processor 297. The user equipment 210 may include a Tx data processor 265, a symbol modulator 270, a transmitter 275, a transmitting and receiving antenna 235, a processor 255, a memory 260, a receiver 240, a symbol demodulator 255, and an Rx data processor 250. Although the antennas 230 and 235 are respectively shown in the base station 205 and the user equipment 210, each of the base station 205 and the user equipment 210 includes a plurality of antennas. Accordingly, the base station 205 and the user equipment 210 according to the present invention support a multiple input multiple output (MIMO) system. Also, the base station 205 according to the present invention may support both a single user-MIMO (SU-MIMO) system and a multi user-MIMO (MU-MIMO) system.

On a downlink, the Tx data processor 215 receives traffic data, formats and codes the received traffic data, interleaves and modulates (or symbol maps) the coded traffic data, and provides the modulated symbols ("data symbols"). The symbol modulator 220 receives and processes the data symbols and pilot symbols and provides streams of the symbols.

The symbol modulator 220 multiplexes the data and pilot symbols and transmits the multiplexed data and pilot symbols to the transmitter 225. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 receives the streams of the symbols and converts the received streams into one or more analog symbols. Also, the transmitter 225 generates downlink signals suitable for transmission through a radio channel by additionally controlling (for example, amplifying, filtering and frequency upconverting) the analog signals. Subsequently, the downlink signals are transmitted to the user equipment through the antenna 230.

In the user equipment 210, the antenna 235 receives the downlink signals from the base station 205 and provides the received signals to the receiver 240. The receiver 240 controls (for example, filters, amplifies and frequency downcoverts) the received signals and digitalizes the controlled signals to acquire samples. The symbol demodulator 245 demodulates the received pilot symbols and provides the demodulated pilot symbols to the processor 255 to perform channel estimation.

Also, the symbol demodulator 245 receives a frequency response estimation value for the downlink from the processor 255, acquires data symbol estimation values (estimation values of the transmitted data symbols) by performing data demodulation for the received data symbols, and provides the data symbol estimation values to the Rx data processor 250. The Rx data processor 250 demodulates (i.e., symbol de-mapping), deinterleaves, and decodes the data symbol estimation values to recover the transmitted traffic data.

Processing based on the symbol demodulator 245 and the Rx data processor 250 is complementary to processing based on the symbol demodulator 220 and the Tx data processor 215 at the base station 205.

On an uplink, the Tx data processor 265 of the user equipment 210 processes traffic data and provides data symbols. The symbol modulator 270 receives the data symbols, multiplexes the received data symbols with the pilot symbols, performs modulation for the multiplexed symbols, and provides the streams of the symbols to the transmitter 275. The transmitter 275 receives and processes the streams of the symbols and generates uplink signals. The uplink signals are transmitted to the base station 205 through the antenna 235.

The uplink signals are received in the base station 205 from the user equipment 210 through the antenna 230, and the receiver 290 processes the received uplink signals to acquire samples. Subsequently, the symbol demodulator 295 processes the samples and provides data symbol estimation values and the pilot symbols received for the uplink. The Rx data processor 297 recovers the traffic data transmitted from the user equipment 210 by processing the data symbol estimation values.

The processors 255 and 280 of the user equipment 210 and the base station 205 respectively command (for example, control, adjust, manage, etc.) the operation at the user equipment 210 and the base station 205. The processors 255 and 280 may respectively be connected with the memories 260 and 285 that store program codes and data. The memories 260 and 285 respectively connected to the processor 280 store operating system, application, and general files therein.

Each of the processors 255 and 280 may be referred to as a controller, a microcontroller, a microprocessor, and a microcomputer. Meanwhile, the processors 255 and 280 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 255 and 280. Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 255 and 280, or may be stored in the memories 260 and 285 and driven by the processors 255 and 280.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

The term, base station used in the present invention may refer to a "cell or sector" when used as a regional concept. A serving base station (or serving cell) may be regarded as a base station which provides main services to UEs and may transmit and receive control information on a coordinated multiple transmission point. In this sense, the serving base station (or serving cell) may be referred to as an anchor base station (or anchor cell). Likewise, a neighboring base station may be referred to as a neighbor cell used as a local concept.

Multiple Antenna System

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

FIG. 3($a$) shows the configuration of a wireless communication system including multiple antennas. As shown in FIG. 3($a$), the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1.

$$R_i = \min(N_T, N_R) \quad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$S=[S_1, S_2, \ldots, S_{N_T}]^T \quad \text{[Equation 2]}$$

In the meantime, individual transmission information pieces $s_1, s_2, \ldots, s_{NT}$ may have different transmission powers. In this case, if the individual transmission powers are denoted by $P_1, P_2, \ldots, P_{NT}$, transmission information having an adjusted transmission power can be represented by a specific vector shown in the following equation 3.

$$\hat{S}=[\hat{S}_1, \hat{S}_2, \ldots, \hat{S}_{N_T}]^T = [PS_1, PS_2, \ldots, PS_{N_T}]^T \quad \text{[Equation 3]}$$

In Equation 3, $\hat{S}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{S}$ having an adjusted transmission power is applied to a weight matrix W, so that $N_T$ transmission signals $x_1, x_2, \ldots, x_{NT}$ to be actually transmitted are configured. In this case, the weight matrix W is adapted to properly distribute transmission information to individual antennas according to transmission channel situations. The above-mentioned transmission signals $x_1, x_2, \ldots, x_{NT}$ can be represented by the following equation 5 using the vector X. Here, $W_{ij}$ denotes a weight corresponding to i-th Tx antenna and j-th information. W represents a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Given $N_R$ Rx antennas, signals received at the respective Rx antennas, $y_1, y_2, \ldots, y_{N_R}$ may be represented as the following vector.

$$y=[y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. Examples of vector expressions are given as below. FIG. 3(b) illustrates channels from $N_T$ Tx antennas to an $i^{th}$ Rx antenna.

As illustrated in FIG. 3(b), the channels from the $N_T$ Tx antennas to an $i^{th}$ Rx antenna may be expressed as follows.

$$h_i^T=[h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R1} & h_{N_R2} & \ldots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n=[n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

As a multi-antenna transmission and reception scheme used for operating a multi-antenna system, it may be able to use FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between transmission antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword.

Among the aforementioned MIMO transmission schemes, the STBC scheme corresponds to a scheme of obtaining time diversity in a manner that an identical data symbol is repeated in a time domain to support orthogonality. Similarly, the SFBC scheme corresponds to a scheme of obtaining frequency diversity in a manner that an identical data symbol is repeated in a frequency domain to support orthogonality. Examples of a time block code used for the STBC and a frequency block code used for the SFBC can be represented as equation 12 and equation 13, respectively. The equation 12 indicates a block code in case of 2 transmission antennas and the equation 13 indicates a block code in case of 4 transmission antennas.

$$\frac{1}{\sqrt{2}}\begin{pmatrix} S_1 & S_2 \\ -S_2^* & S_1^* \end{pmatrix}$$ [Equation 12]

$$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix}$$ [Equation 13]

In the equations 12 and 13, Si (i=1, 2, 3, 4) corresponds to a modulated data symbol. And, in the equations 12 and 13, a row of a matrix corresponds to an antenna port and a column of the matrix corresponds to time (STBC) or frequency (SFBC).

Meanwhile, among the aforementioned MIMO transmission schemes, the CDD scheme corresponds to a scheme of increasing frequency diversity by increasing delay propagation on purpose. FIG. 4 shows an example of a general CDD structure in a multi-antenna system. FIG. 4(a) shows a scheme of applying cyclic delay in time domain. As shown in FIG. 4(b), the CDD scheme applying the cyclic delay of FIG. 4(a) can also be implemented by applying phase-shift diversity.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 5:
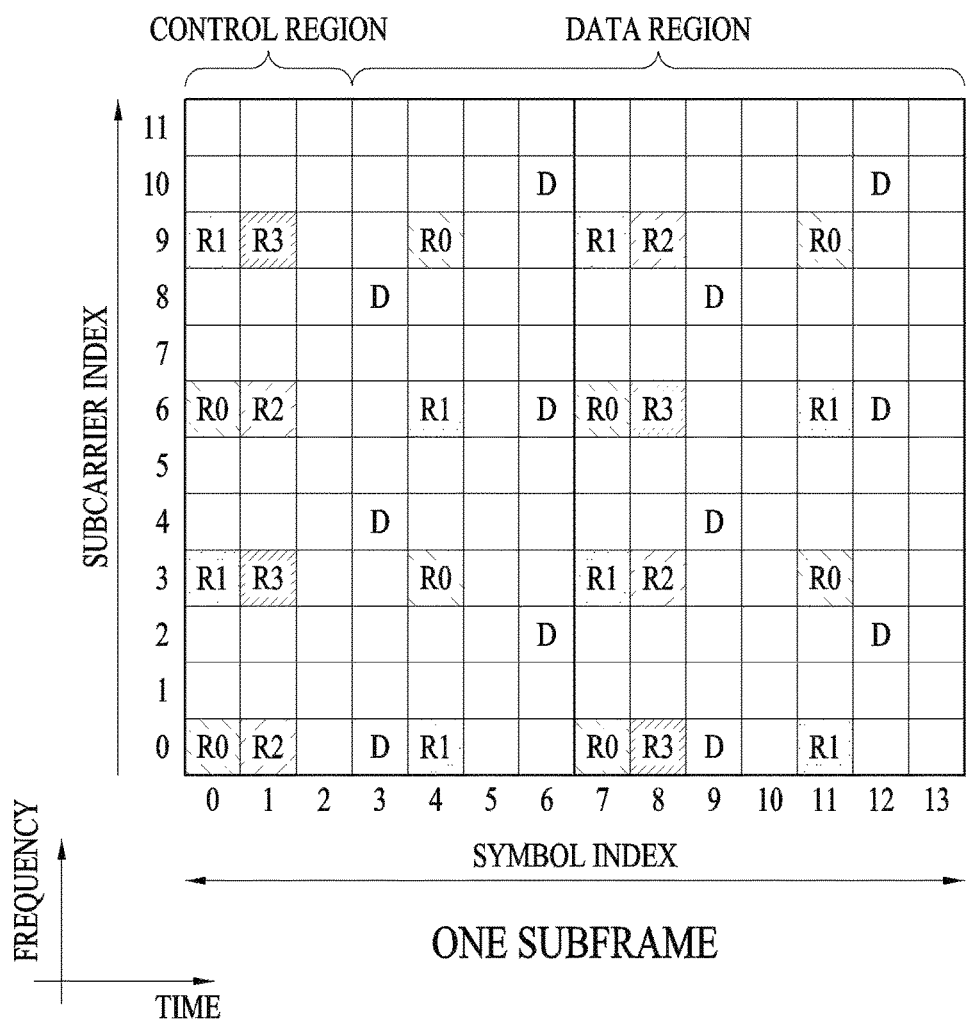
FIG. 5 is a diagram illustrating legacy CRS and DRS patterns.

FIG. 5 illustrates a CRS and DRS pattern for an RB (including 14 OFDM symbols in time by 12 subcarriers in frequency in case of a normal CP) in a system where an eNB has four Tx antennas. In FIG. 5, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 6:
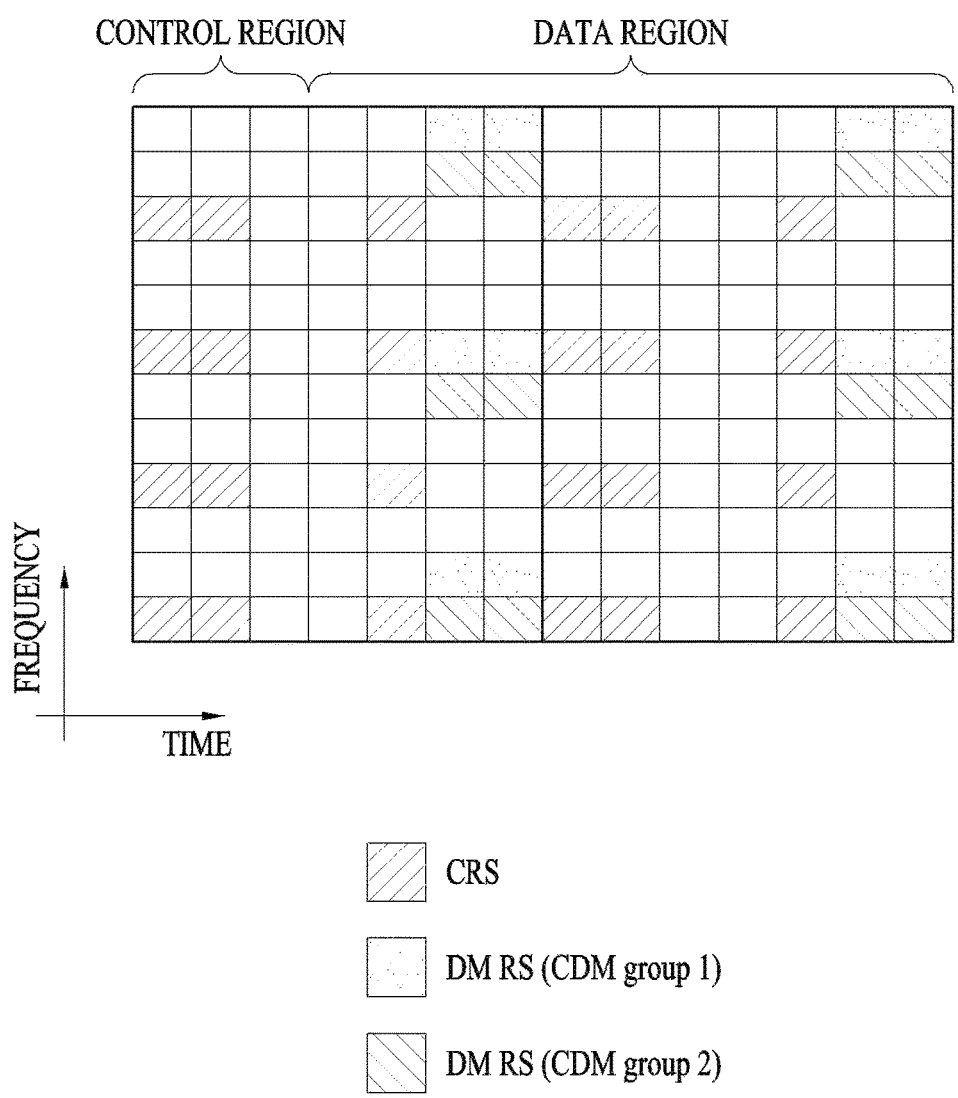
FIG. 6 is a diagram illustrating an example of a DM RS pattern.

FIG. 6 illustrates an exemplary DM RS pattern defined for the LTE-A system. In FIG. 6, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 6, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 7:
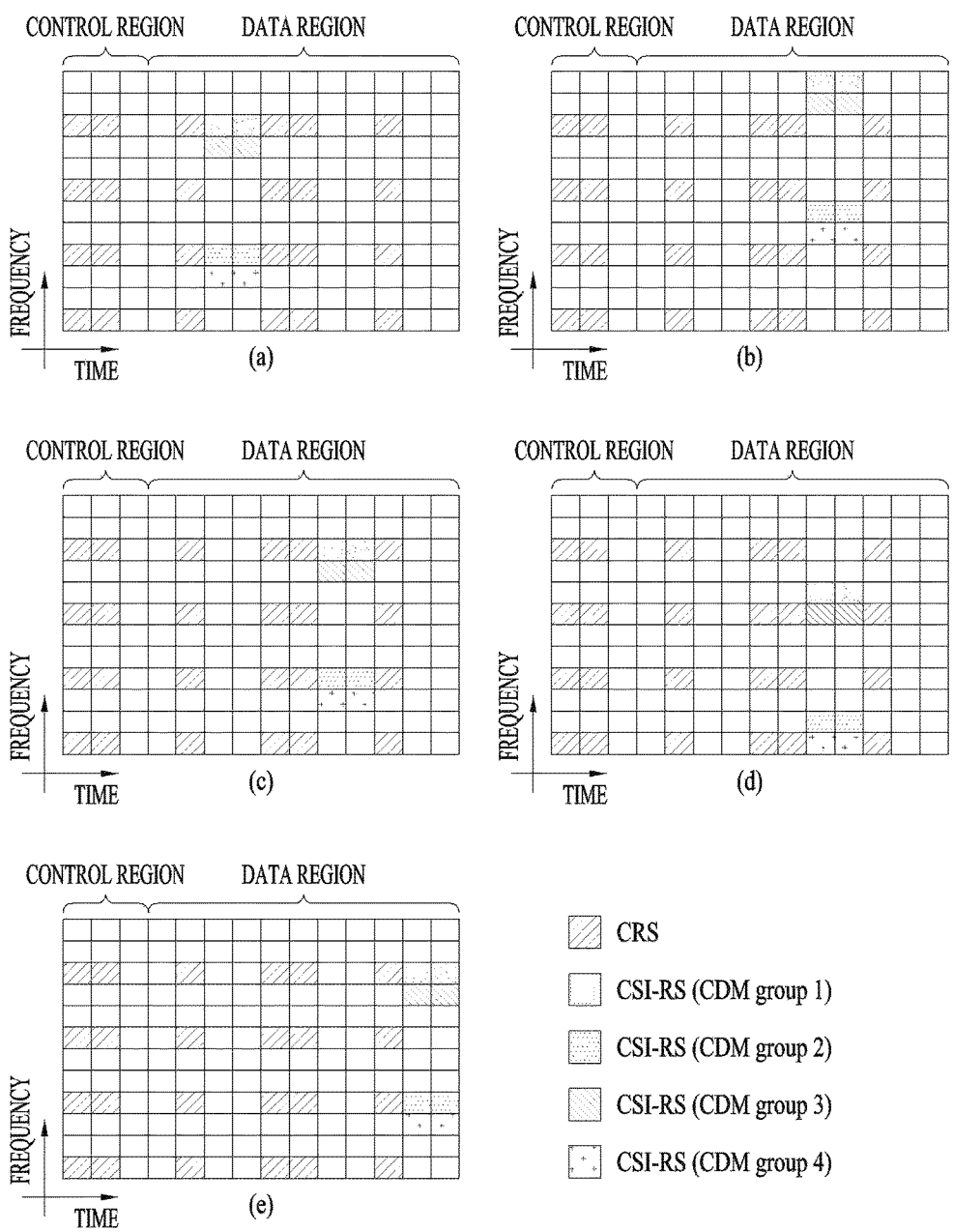
FIG. 7 is a diagram illustrating examples of a CSI-RS pattern.

FIG. 7 illustrates exemplary CSI-RS patterns defined for the LTE-A system. In FIG. 7, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 7(a) to 7(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 7(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 7(a) is applicable to the CSI-RS patterns illustrated in FIGS. 7(b) to 7(e).

RS patterns shown in FIGS. 5 to 7 are disclosed only for illustrative purposes, and the scope or spirit of the present invention are not limited only to a specific RS pattern. That is, even in the case in which RS patterns different from those of FIGS. 5 to 7 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 7(*a*) to 7(*e*)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 7, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 8:
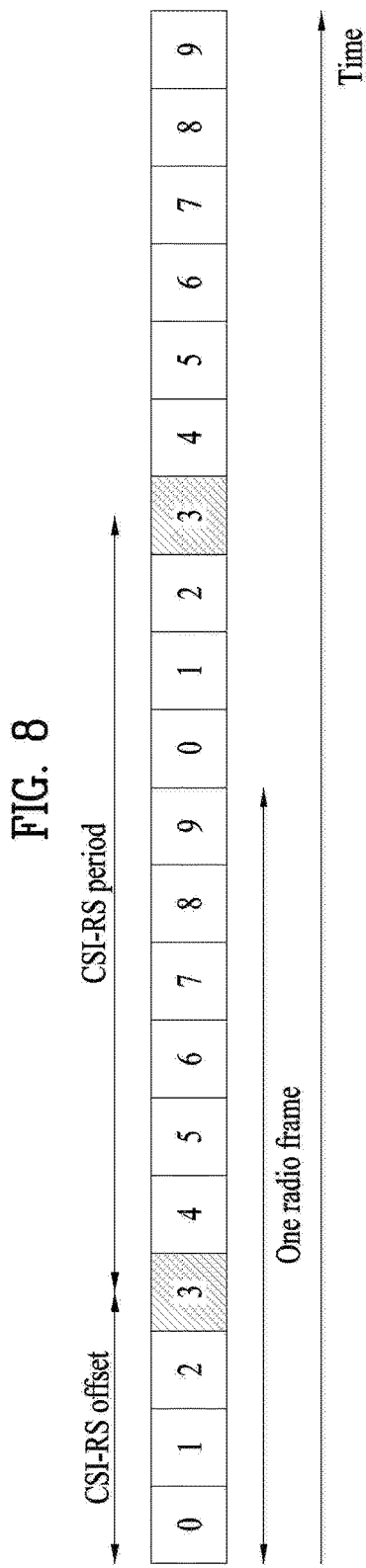
FIG. 8 is a diagram for explaining an example of a scheme of periodically transmitting a CSI-RS.

FIG. 8 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 8 shows a radio frame configured by 10 subframes (subframe number 0 to 9). In FIG. 8, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can he commonly referred to as CQI (or CSI) except a case of individually explaining the CQI, the PMI and/or the RI. And, the CSI-RS transmission period and the offset can be separately designated according to a CSI-RS configuration.

Figure 9:
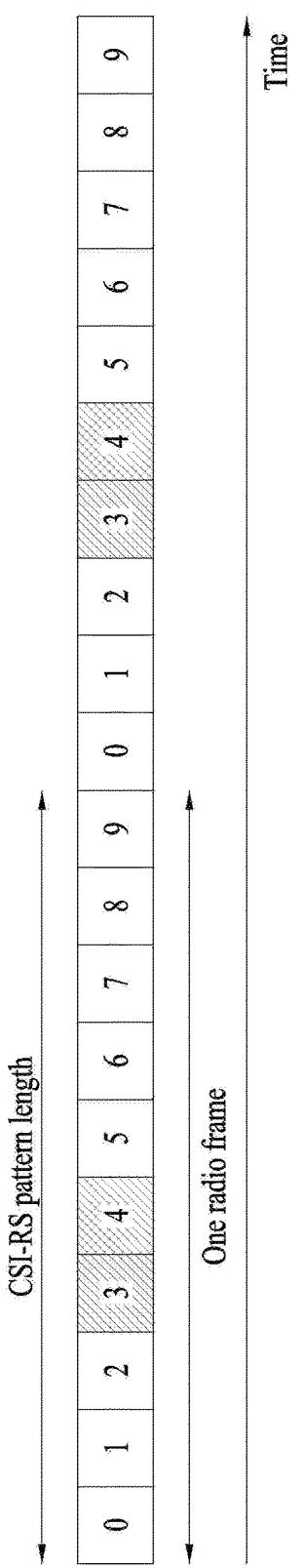
FIG. 9 is a diagram for explaining an example of a scheme of aperiodically transmitting a CSI-RS.

FIG. 9 is a diagram for explaining an example of a scheme of aperiodically transmitting a CSI-RS. In FIG. 9, for example, one radio frame is configured by 10 subframes (subframe number 0 to 9). As shown in FIG. 9, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 9 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when a base station informs UEs of contents on system information, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This type of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LIE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 10:
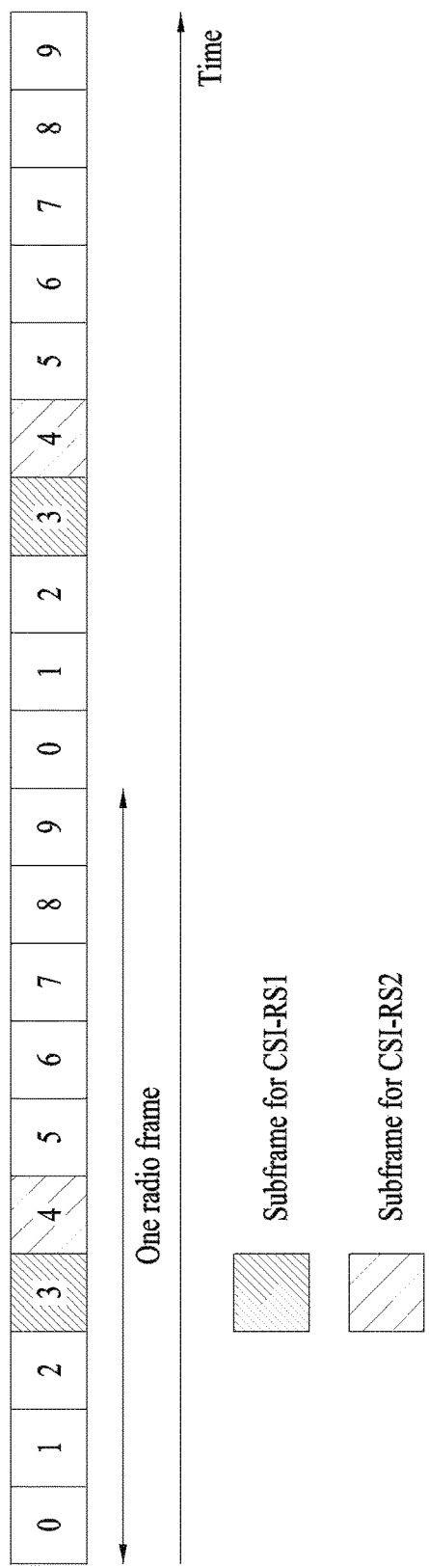
FIG. 10 is a diagram for explaining an example of using two CSI-RS configurations.

FIG. 10 is a diagram for explaining an example of using two CSI-RS configurations. In FIG. 10, for example, one radio frame is configured by 10 subframes (subframe number 0 to 9). In FIG. 10, in case of a first CSI-RS configuration, i.e., a CSI-RS a transmission period of a CSI-RS is 10 ms and a transmission offset of a CSI-RS is 3. In FIG. 10, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 10, if the base station asks the UE to make a feedback on the first CSI-RS configuration (CSI-RSI), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by a CRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 7(a) and a CSI-RS according to another CSI-RS configuration is designated to be transmitted in an RE position shown in FIG. 7(b)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Figure 11:
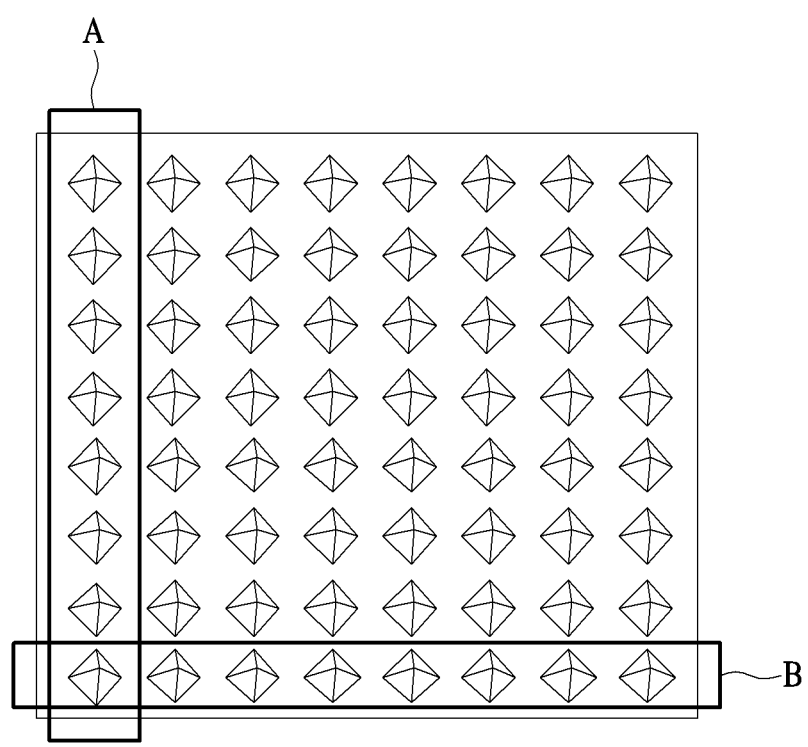
FIG. 11 illustrates an active antenna system (AAS).

FIG. 11 illustrates an active antenna system (AAS).

In a wireless communication system after LTE Rel-12, the introduction of the antenna system utilizing the AAS has been discussed. Since each antenna of the AAS corresponds to an active antenna including an active circuit, an antenna pattern can be changed to adapt to a wireless communication environment. That is, the AAS is considered as a technology capable of reducing interference or performing efficient beamforming.

Moreover, if the AAS is established in two dimensions (i.e., 2D-AAS), it is possible to adjust a beam direction at a main lobe of each antenna not only in the horizontal direction as in the related art but also in the vertical direction in terms of the antenna pattern. Thus, the beam adaptation can be performed more efficiently in three dimensions. Further, a transmitted beam can be changed actively depending on a location of a UE based on the beam adaptation. The 2D-AAS i.e., the antenna system having multiple antennas can be implemented by installing antennas in the vertical and horizontal directions.

When the above-described 2D-ASS is introduced, a large number of antennas may be installed in a vertical antenna domain and thus the number of antennas is remarkably increased. To efficiently manage such a large number of the antennas, reference signal (RS) design for measuring a channel at each antenna and feedback design for a UE to provide feedback of channel information between each antenna and the UE becomes very important. The reason for this is that as the number of antennas increases, RS overhead and feedback overhead generally increases either linearly or exponentially.

In the current LTE system, REs (resource elements) amounting to the number of antenna ports are allocated for a CSI-RS in each PRB (physical resource block) pair. If 64 antennas are used as shown in FIG. 11 and a reference signal is designed to be similar to that of the current LTE system, 64 resource elements need to be allocated for the CSI-RS in each PRB pair. In addition, in the case of the normal CP (cyclic prefix), considering that 168 resource elements are present in the PRB pair, too many resource elements are currently used for the CSI-RS. Moreover, considering control channels and other reference signals, resource elements that can be used for transmitting actual data are significantly insufficient.

In addition, a receiving end can measure channel information between a transmitting end and the receiving end using, for example, the above-described reference signal and feed back channel state information (CSI) calculated based on the measured channel to the transmitting end. However, in the communication system to which the above-described 2D-AAS is applied, since a large number of antennas are used, the number of antennas required by the receiving end for the CSI feedback increases. For example, 4-bit precoding matrix indicator (PMI) information may be required for 4 Tx antennas. Moreover, in the case of the 2D-AAS using 64 antennas shown in FIG. 11, it is expected that, for example, 64-bit PMI information will be required. However, in this case, communication efficiency may be degraded due to the large amount of channel information. Furthermore, the calculation amount of the PMI, CQI, and RI for CSI may also be significantly increased, and it may become difficult for the receiving end to generate the CSI within a limited time due to the increased calculation amount. Further, the increased calculation amount may increase overall complexity of the receiving end.

To overcome the problems that occur when the 2D-AAS is applied, a method for using a precoded CSI-RS has been proposed. For example, precoding may be applied to some or all of antenna elements of a BS to create multiple beams. When the precoded CSI-RS is used, a UE may measure a channel using reference signals of the created multiple beams. For example, when N antenna elements are used, M beams are created using precoding, and N is greater than M, M resource elements may be used to transmit a reference signal in each PRB pair of a subframe reserved for reference signal transmission. Since in this case, the M REs are used for the RS transmission rather than N REs, the RS overhead may be reduced. In addition, since the amount of feedback related to the RS may also be reduced, overall signal overhead can be improved.

As an example of measuring a channel using the precoded CSI-RS, the BS may create a plurality of elevation (vertical) beams, and the UE may select one among the plurality of elevation beams. For example, the BS where the 2D-AAS is applied may have antennas shown in FIG. 11. Specifically, as shown in FIG. 11, antennas in the 2D-AAS consists of vertical antennas and horizontal antennas. For example, various types of precoding may be applied to antennas in column A of FIG. 11 to create various elevation beams, and reference signals may be transmitted to UEs through the created beams. The UE may calculate reference signal received power (RSRP) for each beam using a reference signal. For example, the UE may feed back information on upper N beams (where N is a natural number) with high RSRP to the BS. Thereafter, the BS may select an elevation beam suitable for the UE based on the information received from the UE. In addition, the BS may transmit a reference signal for horizontal antenna selection to the UE by applying precoding corresponding to the selected elevation beam to each of the whole antenna columns. The UE may measure a channel using the reference signal for the horizontal antenna port where precoding of the selected elevation beam is applied and then feedback CSI (e.g., RI, PMI, and CQI) for the measured channel to the BS.

During this process, only a vertical antenna domain is used in selecting an elevation beam. After the elevation beam is selected, only a horizontal antenna domain is used to select a horizontal antenna. Accordingly, the RS overhead may be reduced compared to a method of transmitting reference signals for all antenna elements. In addition, since CSI for only the horizontal antenna port is fed back to the BS after the elevation beam selection, signaling overhead for feeding back the CSI may also be reduced.

Figure 12:
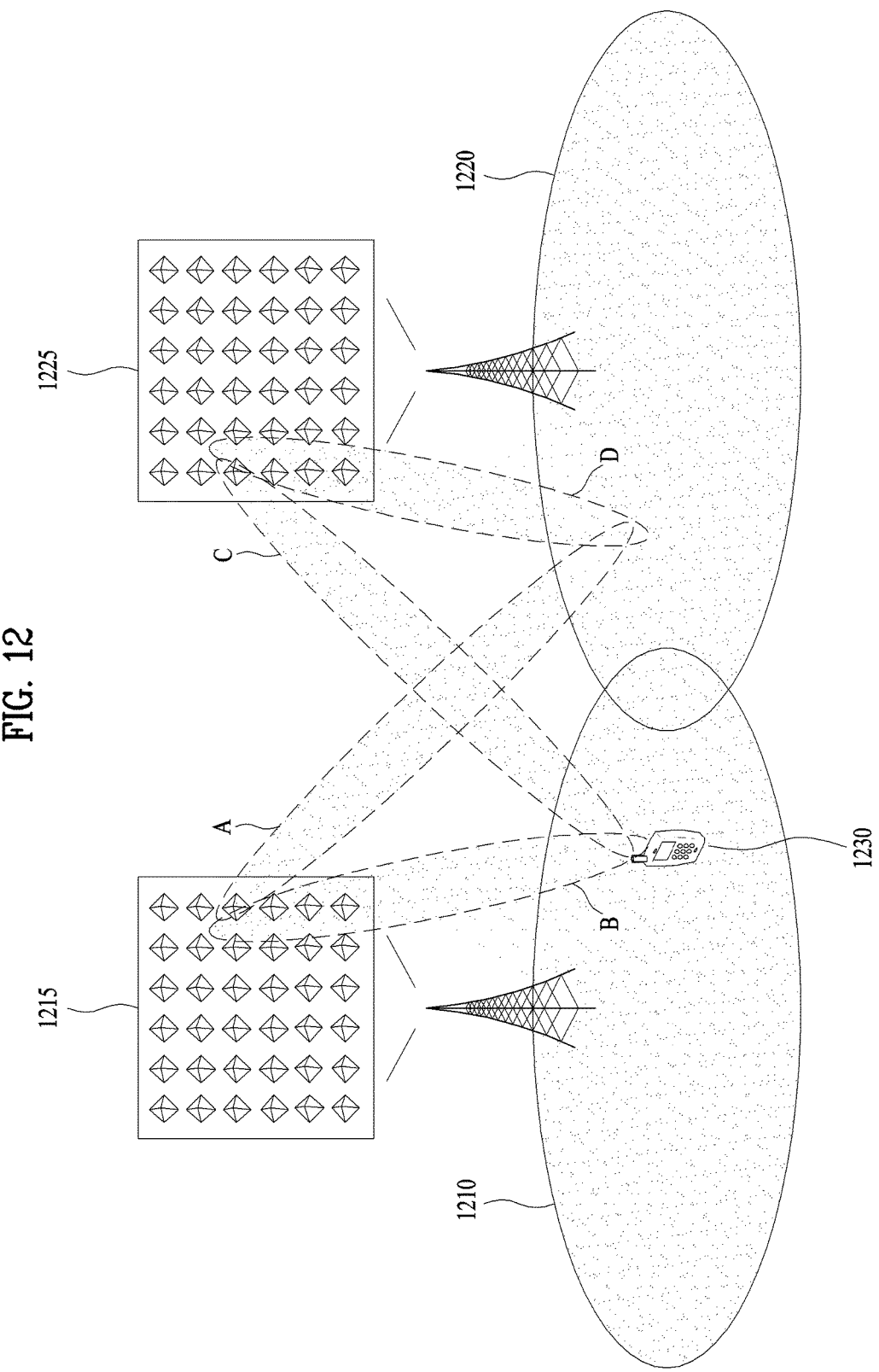
FIG. 12 illustrates an example of measurement using a precoded CSI-RS.

FIG. 12 illustrates an example of measurement using a precoded CSI-RS.

In FIG. 12, a serving cell 1210 of a UE 1230 and a neighboring cell 1220 are illustrated. Referring to FIG. 12, the serving cell 1210 creates elevation beams A and B, and the neighboring cell 1220 creates elevation beams C and D. In FIG. 12, considering a distance and a beam direction, the beam B may be an elevation beam suitable for the UE 1230. For example, the beam B may be selected based on RSRP for the beams A and B. Meanwhile, the UE 1230 may experience interference caused by the neighboring cell 1220. For example, compared to the beam D, the beam C may cause higher interference to the UE 1230. Thus, if a BS of the neighboring cell 1220 uses the beam D instead of the beam C, the interference to the UE 1230 may be reduced.

In the following embodiments, operations performed by a UE to report reference signal received power (RSRP) or reference signal received quality (RSRQ) to reduce interference caused by a neighboring cell as described above with reference to FIG. 12 will be described.

In the current LTE or LTE-A (advanced) communication system, a UE is configured to measure RSRP based on a DRS-CSI-RS (discovery reference signal) using a common reference signal (CRS) or a DRS and transmit the measured RSRP to a BS. In the following embodiments, it is assumed that a UE can measure RSRP without limitation on types of a BS and a reference signal. For example, a UE may measure RSRP based on a CRS or DRS-CSI-RS. In addition, a UE may measure RSRP using a RRM-RS (radio resource management), which is a separate reference signal for RRM measurement.

In addition, in the LTE or LTE-A communication system, a UE is configured to feed back RSRP measured in each cell based on event triggering. More particularly, the UE may report an identifier (ID) of a cell with high RSRP and the RSRP to discover an optimal cell based on event triggering. For example, the UE may measure RSRP using a DRS-CSI-RS and then report the measured RSRP. In this case, a BS may configure a DRS measurement timing configuration (DMTC) and inform the UE of information on resources for discovering a transmission point (TP). Moreover, for example, the BS may configure the DRS-CSI-RS and inform the UE of information on a reference signal for RSRP measurement. The UE retrieves a primary synchronization signal (PSS) in a resource region that is recognized through the DMTC to discover cells. The UE may measure the RSRP using DRS-CSI-RSs, which appear in the PSS after a predetermined offset, through DRS-CSI-RS configurations related to the search results. In this case, the UE may feed back, to the BS, IDs of up to three RSs among the DRS-CSI-RSs having RSRP values equal to or greater than a prescribed threshold value and corresponding RSRP values. At this time, the UE may sequentially feed back information on the reference signals in descending order from the highest RSRP.

Hereinafter, embodiments related to RSRP measurement and/or reporting will be described. In the following embodiments, the elevation beam may be referred to as a vertical beam. The vertical beam means a beam of which an incidence angle can be changed up and down by precoding in a two-dimensional antenna plane, and the horizontal beam may mean a beam of which an incidence angle can be changed from side to side by precoding in the two-dimensional antenna plane or antenna array. Moreover, 3D-MIMO may be referred to as a FD-MIMO (full dimensional MIMO).

Embodiment 1

In embodiment 1, reference signals for RSRP measurement can be divided into two sets. For example, the reference signals can be divided into a first set and a second set. In this case, a UE may respectively feed back RSRP for the first set and RSRP for the second set for an event triggering operation.

For example, the first set may include reference signals for a serving cell, and the second set may include reference signals for an interference cell (e.g., neighboring cell). For example, in the case of the 3D-MIMO, reference signals for measuring RSRP for elevation beams of the serving cell may belong to the first set, and reference signals for measuring RSRP for elevation beams of interference cells may belong to the second set. Here, the interference cells may be a cell that does not use the 2D-AAS. In this case, reference signals for measuring RSRP for horizontal beams of the interference cells may also belong to the second set. In addition, for example, the first and second sets may be designated by a BS in the same cell. The BS may transmit information on a reference signal to the UE. For example, the information on the reference signal may include a type of the reference signal, an ID of the reference signal, a reception interval of the reference signal, and/or information on designation of the reference signal sets.

For example, a DRS-CSI-RS may be used for the RSRP measurement. In this case, the UE may determine which one of the first and second sets each DRS-CSI-RS belongs to on the basis of a physical cell ID of a DRS-CSI-RS configuration. In addition, the UE may feed back, to the BS, IDs of upper N reference signals (where N is a natural number) among reference signals that belong to the first set and have RSRP equal to or greater than a predetermined threshold and corresponding RSRP. Moreover, the UE may feed back, to the BS, IDs of upper M reference signals (where M is a natural number) among reference signals that belong to the second set and have RSRP equal to or greater than a predetermined threshold and corresponding RSRP. In this case, M and N may predefined so as to be equal to or different from each other. Alternatively, M and N may be configured either statically or semi-statically through higher layer signaling (e.g., RRC signaling).

In embodiment 1, the UE performs feedback for the first and second sets, respectively. As described above with reference to FIG. 12, the BS may determine an elevation beam of the serving cell suitable for the UE based on the feedback for the first set. In addition, the BS may obtain information on a cell and an elevation beam which may cause serious interference to the UE based on the feedback for the second set. Moreover, the BS may perform scheduling coordination with a neighboring cell based on the obtained information.

Embodiment 2

In embodiment 2, an event triggering operation for RSRP feedback will be described. According to the embodiment 2, the event triggering operation can be defined as follows: "a UE feeds back IDs of at least N reference signals (where N is a natural number) among reference signals having RSRP equal to or smaller than a threshold and corresponding RSRP to a BS". The event triggering operation of the embodiment 2 could be interpreted to mean that information on lower N reference signals among the reference signals having the RSRP equal to or smaller than the threshold is sequentially transmitted. The value of N may be predetermined between transmitting and receiving ends or configured either statically or semi-statically through higher layer signaling (e.g., RRC signaling).

In the embodiment 2, the RSRP feedback method described above in the embodiment 1 can be applied. For example, a UE may divide reference signals for RSRP measurement into two sets. For example, the first set may include reference signals for a serving cell, and the second set may include reference signals for an interference cell (e.g., neighboring cell). For example, in the case of the 3D-MIMO, reference signals for measuring RSRP for elevation beams of the serving cell may belong to the first set, and reference signals for measuring RSRP for elevation beams of interference cells may belong to the second set. Here, the interference cells may be a cell that does not use the 2D-AAS. In this case, reference signals for measuring RSRP for horizontal beams of the interference cells may also belong to the second set. In addition, for example, the first and second sets may be designated by a BS in the same cell. The BS may transmit information on a reference signal to the UE. For example, the information on the reference signal may include a type of the reference signal, an ID of the reference signal, a reception interval of the reference signal, and/or information on designation of the reference signal sets.

For example, the event triggering operation for the first set can be defined as follows: "a UE feeds back IDs of at least $N_A$ reference signals among reference signals having RSRP equal to or greater than a threshold and corresponding RSRP to a BS". In addition, for example, the event triggering operation for the second set can be defined as follows: "a UE feeds back IDs of at least $N_B$ reference signals among reference signals having RSRP equal to or smaller than a threshold and corresponding RSRP to a BS". Here, $N_A$ and $N_B$ are natural numbers. In addition, the values of $N_A$ and $N_B$ may be predetermined between transmitting and receiving ends or configured either statically or semi-statically through higher layer signaling (e.g., RRC signaling).

In the embodiment 2, the UE performs feedback for the first and second sets, respectively. As described above with reference to FIG. 12, the BS may determine an elevation beam of the serving cell suitable for the UE based on the feedback for the first set. In addition, the BS may obtain information on an interference cell and an elevation beam which may cause less interference to the UE based on the feedback for the second set. Moreover, the BS may perform scheduling coordination with a neighboring cell based on the obtained information.

Embodiment 2-1

Regarding the event triggering operation of the embodiment 2 (i.e., "a UE feeds back IDs of at least N reference signals among reference signals having RSRP equal to or smaller than a threshold and corresponding RSRP to a BS"), if a value of the measured RSRP is too small, the UE may not recognize the RSRP value. That is, the UE may not calculate the RSRP for the corresponding reference signals. In addition, the UE may not also decode the IDs of the corresponding reference signals.

Thus, RSRP equal to or smaller than a predetermined value X may be defined as 'a value that cannot be recognized'. In addition, the UE may feed back IDs of all the reference signals having the RSRP corresponding to 'the value that cannot be recognized' to the BS. For example, the DRS-CSI-RS may be used as a reference signal for the RSRP measurement. In this case, the UE may recognize IDs of configured DRS-CSI-RSs through configuration information. In addition, the UE may feedback IDs of all the reference signals having the RSRP defined as 'the value that cannot be recognized' to the BS. For example, the UE may feedback IDs of M reference signals having, the RSRP defined as 'the value that cannot be recognized' to the BS. If the number M of the reference signals having the RSRP defined as 'the value that cannot be recognized' is smaller than the number N of reference signals of which RSRP and IDs need to be reported according to the event triggering operation, the UE may feed back IDs of (N-M) reference signals and corresponding RSRP to the BS. The predetermined value X may be determined between the BS and UE in advance. Alternatively, it may be set to a different value per UE according to each UE's ability. Further, the predetermined value X may be statically/semi-statically configured through higher layer signaling such as RRC signaling.

Embodiment 2-2

In the above-described embodiments, if the two event triggering operations, i.e., "a UE feeds back IDs of at least N reference signals among reference signals having RSRP equal to or greater than a threshold and corresponding RSRP to a BS" and "a UE feeds back IDs of at least N reference signals among reference signals having RSRP equal to or smaller than a threshold and corresponding RSRP to a BS" are simultaneously performed, it may be inefficient. For example, the BS may estimate interference levels of a reference signal causing less interference and/or a reference signal causing strong interference and then adjust scheduling based on the estimation. Thus, in the above-described two event triggering operations, instead of feeding back IDs of reference signals that satisfy the conditions and corresponding RSRP to the BS, the UE may feed back only the IDs of the reference signals that satisfy the conditions. The UE may be configured to always perform such the event triggering operation (i.e., feedback of the IDs of the reference signals that satisfy the conditions). However, the above-mentioned event triggering operation may be configured either statically or semi-statically through higher layer signaling (e.g., RRC signaling). In other words, feedback of the RSRP of the reference signals that satisfy the predetermined conditions may also be configured either statically or semi-statically.

Embodiment 3

In embodiment 3, the event triggering operation for the RSRP feedback will be described. According to the embodiment 3, the event triggering operation can be defined as follows: "a UE feeds back IDs of at least $N_S$ reference signals (where $N_S$ is a natural number) among reference signals having RSRP equal to or greater than a first threshold and corresponding RSRP to a BS and also feeds back IDs of at least $N_I$ reference signals (where $N_I$ is a natural number) among reference signals having RSRP equal to or smaller than a second threshold and corresponding RSRP to the BS". The values of $N_S$ and $N_I$ may be predetermined between transmitting and receiving ends or configured either statically or semi-statically through higher layer signaling (e.g., RRC signaling). Here, the first and second thresholds may be different from each other.

In the embodiment 3, the RSRP feedback method described above in the embodiment 1 can be applied. For example, a UE may divide reference signals for RSRP measurement into two sets. The first set may include reference signals for a serving cell, and the second set may include reference signals for an interference cell (e.g., neighboring cell). For example, in the case of the 3D-MIMO, reference signals for measuring RSRP for elevation beams of the serving cell may belong to the first set, and reference signals for measuring RSRP for elevation beams of interference cells may belong to the second set. Here, the interference cells may be a cell that does not use the 2D-AAS. In this case, reference signals for measuring RSRP for horizontal beams of the interference cells may also belong to the second set. In addition, for example, the first and second sets may be designated by a BS in the same cell. The BS may transmit information on a reference signal to the UE. For example, the information on the reference signal may include a type of the reference signal, an ID of the reference signal, a reception interval of the reference signal, and/or information on designation of the reference signal sets.

For example, the event triggering operation for the first set can be defined as follows: "a UE feeds back IDs of at least $N_S$ reference signals among reference signals having RSRP equal to or greater than a threshold and corresponding RSRP to a BS". In addition, for example, the event triggering operation for the second set can be defined as follows: "a UE feeds back IDs of at least $N_I$ reference signals among reference signals having RSRP equal to or smaller than a threshold and corresponding RSRP to a BS". Here, $N_S$ and $N_I$ are natural numbers. In addition, the values of $N_S$ and $N_I$ may be predetermined between transmitting and receiving ends or configured either statically or semi-statically through higher layer signaling (e.g., RRC signaling).

In addition, as a single operation for the first and second sets, the event triggering operation can be defined as follows: "a UE feeds back IDs of at least $N_S$ reference signals among reference signals having RSRP equal to or greater than a first threshold in a first set and corresponding RSRP to a BS and also feeds back IDs of at least $N_I$ reference signals among reference signals having RSRP equal to or smaller than a second threshold in a second set and corresponding RSRP to the BS".

Embodiment 3-1

Regarding one of the operations of the embodiment 3, i.e., "a UE feeds back IDs of at least $N_I$ reference signals (where $N_I$ is a natural number) among reference signals having RSRP equal to or smaller than a second threshold and corresponding RSRP to a BS", if a value of the measured RSRP is too small, the UE may not recognize the RSRP value. That is, the UE may not calculate the RSRP for the corresponding reference signals. In addition, the UE may not also decode the IDs of the corresponding reference signals.

Thus, RSRP equal to or smaller than a predetermined value X may be defined as 'a value that cannot be recognized'. In addition, the UE may feed back IDs of all the reference signals having the RSRP corresponding to 'the value that cannot be recognized' to the BS. For example, the DRS-CSI-RS may be as a reference signal for the RSRP measurement. In this case, the UE may recognize IDs of configured DRS-CSI-RSs through configuration information. In addition, the UE may feedback IDs of all the reference signals having the RSRP defined as 'the value that cannot be recognized' to the BS. For example, the UE may feedback IDs of M reference signals having the RSRP defined as 'the value that cannot be recognized' to the BS. If the number M of the reference signals having the RSRP defined as 'the value that cannot be recognized' is smaller than the number $N_I$ of reference signals of which RSRP and IDs need to be reported according to the event triggering operation, the UE may feed back IDs of ($N_I$-M) reference signals and corresponding RSRP to the BS. The predetermined value X may be determined between the BS and UE in advance. Alternatively, it may be set to a different value per UE according to each UE's ability. Further, the predetermined value X may be statically/semi-statically configured through higher layer signal such as RRC signaling.

Embodiment 3-2

Regarding the event triggering operation of the embodiment 3, i.e., "a UE feeds back IDs of at least $N_S$ reference signals (where $N_S$ is a natural number) among reference signals having RSRP equal to or greater than a first threshold and corresponding RSRP to a BS and also feeds back IDs of at least $N_I$ reference signals (where $N_I$ is a natural number) among reference signals having RSRP equal to or smaller than a second threshold and corresponding RSRP to the BS", if all of the IDs of the reference signals that satisfy the conditions and the corresponding RSRP are transmitted, it may be inefficient. Thus, in the above-described event triggering operation, instead of feeding back the IDs of the reference signals that satisfy the conditions and the corresponding RSRP to the BS, the UE may feed back only the IDs of the reference signals that satisfy the conditions. The UE may be configured to always perform such the event triggering operation (i.e., feedback of the IDs of the reference signals that satisfy the conditions). However, the above-mentioned event triggering operation may be configured either statically or semi-statically through higher layer signaling (e.g., RRC signaling). In other words, feedback of the RSRP of the reference signals that satisfy the predetermined conditions may also be configured either statically or semi-statically.

Embodiment 4

According to embodiment 4, the method proposed in the embodiment 2-1 and/or the embodiment 3-1 can be defined as an event triggering operation to search for a reference signal having less interference. For example, the event triggering operation of the embodiment 4 can be defined as follows: "when a UE cannot recognize IDs due to low RSRP, the UE feeds back IDs of all reference signals". For example, when the DRS-CSI-RS is used as a reference signal for the RSRP measurement, the UE may obtain information on IDs of configured DRS-CSI-RSs from configuration information. In this case, the UE may feed back all IDs that the UE cannot recognize among IDs that the UE currently knows to a BS. In addition, the UE may define RSRP equal to or smaller than a predetermined RSRP value as 'a value that cannot be recognized', and then determine IDs of reference signals having the RSRP corresponding to 'the value that cannot be recognized' based on configuration information on reference signals. Moreover, the UE may feed back the IDs of all the reference signals having the RSRP corresponding to 'the value that cannot be recognized'. Further, the UE may feedback a predetermined number of IDs among the IDs of the reference signals having the RSRP corresponding to 'the value that cannot be recognized'.

Embodiment 5

In the above-described embodiments, if a UE calculates and feeds back all RSRP for multiple reference signals, it may cause significant loads to the UE. In addition, it may also significantly increase UE complexity. Accordingly, a time required for measuring received power of a reference signal having RSRP equal to or smaller than prescribed RSRP may be set to be lower than that required for measuring normal RSRP. For example, a measurement time of N ms may be configured to measure the normal RSRP. When the UE intends to measure RSRP to determine reference signals having RSRP equal to or smaller than the prescribed RSRP, the UE may be configured to perform the measurement during M ms. Here, M may be set to be smaller than N. That is, considering that when RSRP is small, it is difficult to measure and calculate the RSRP, the measurement time (i.e., M ms) for the small RSRP may be set to be smaller than the measurement time (N ms) for the normal RSRP. By doing so, the loads of the UE can be reduced.

Figure 13:
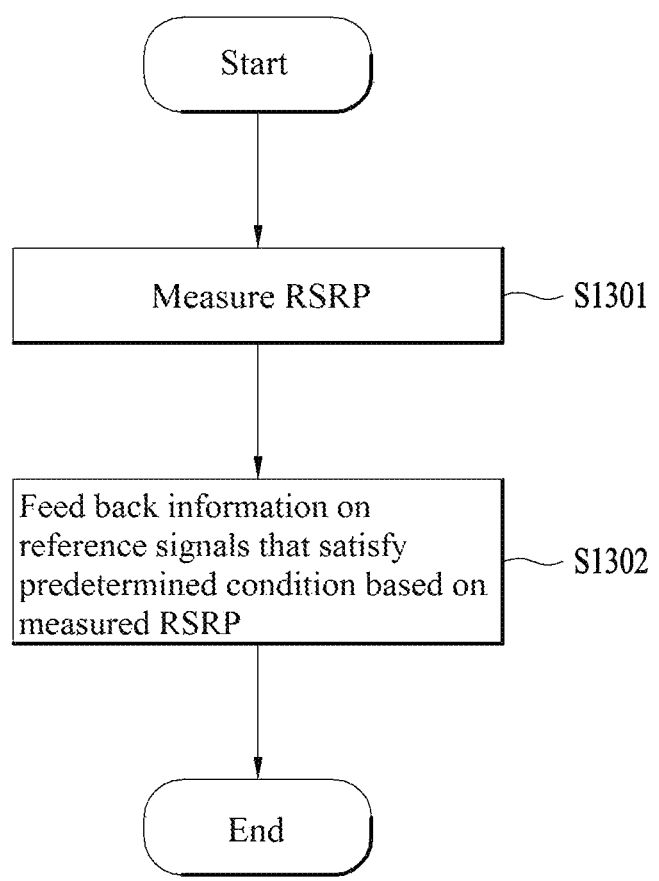
FIG. 13 is a flowchart for explaining a method for feeding back a reference signal according to an embodiment of the present invention.

FIG. 13 is a flowchart for explaining a method for feeding back a reference signal according to an embodiment of the present invention.

Referring to FIG. 13, a UE is configured to measure RSRP [S1301] and feed back information on reference signals that satisfy a predetermined condition based on the measured RSRP [S1302]. As described above, the UE may be configured to measure a reference signal in a communication environment where the 2D-AAS is applied. In addition, the steps of FIG. 13 may be performed by a BS to select elevation beams for a UE. Thus, the UE may be configured to measure a reference signal for each elevation beam where precoding is applied. In this case, each elevation beam in the same cell may be created by applying precoding to antenna elements in the same column. Moreover, each elevation beam in the same cell may be configured to have a different elevation through precoding. That is, each elevation beam in the same cell may be configured to have a different angle in terms of an antenna plane in the vertical direction from the 2D-AAS antenna plane.

When measuring the RSRP [S1301], the UE may perform reference signal measurement without limitation on types of a BS and a reference signal. For example, the UE may perform measurement for reference signals of its serving cell and/or neighboring cell (or interference cell). In addition, as described above in the embodiment 1, the UE may perform the reference signal measurement for reference signals in two sets. Moreover, the UE may be configured to have the same measurement time with respect to all reference signals. However, as described above in the embodiment 5, a measurement time for measuring a reference signal having RSRP equal to or smaller than a predetermined value may be set to be smaller than that for measuring other reference signals. Furthermore, the RSRP measurement [S1301] may include reference signal reception. Additionally, the UE may receive reference signal configuration information to receive the reference signal.

Thereafter, the UE may feed back the information on the reference signals that satisfy the predetermined condition based on the measured RSRP [S1302]. In this case, the reference signals that satisfying the predetermined condition may include a predetermined number of reference signals having RSRP equal to or greater than a first threshold and/or a predetermined number of reference signals having RSRP equal to or smaller than a second threshold as described above in the embodiments 1 to 4. In addition, as described in the embodiments 2-1, 3-1, and 4, the predetermined condition may imply a reference signal having RSRP that cannot be recognized by the UE. Moreover, the UE may feed back an ID of the reference signal and the measured RSRP as information on the reference signal, and in some cases, the UE may be configured to feed back only the ID of the reference signal.

Although not shown in FIG. 13, the BS may determine an elevation beam suitable for the UE and/or an elevation beam that causes interference to the UE based on the feedback received from the UE. The BS may transmit a reference signal to the UE by applying precoding for the elevation beam suitable for the UE to antenna elements in each row. In this case, the UE may perform CSI feedback for horizontal ports, and the BS may select vertical and horizontal beams suitable for the UE based on the CSI feedback. In addition, the BS may mitigate the interference to the UE by sharing information on the elevation beam that causes the interference to the UE with a neighboring BS.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit is located at the interior or exterior of the processor and may transmit and receive data to and from the processor via various known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The above-described embodiments of the present invention can be applied to various mobile communication systems.

What is claimed is:

1. A method for feeding back reference signal information by a user equipment (UE) in wireless communication using a two-dimensional active antenna system (2D-AAS) including multiple antennas, the method comprising:
receiving, from a base station (BS), a reference signal configuration including identifiers (IDs) of a plurality of reference signals included in a first reference signal set and a second reference signal set;
receiving, from the BS, the plurality of reference signals, where a plurality of precoding is applied respectively;
determining a reference signal that is not successfully received based on the reference signal configuration;
measuring reference signal received power (RSRP) for each of the plurality of reference signals; and
transmitting, to the BS, information on at least part of the first reference signal set and information on at least part of the second reference signal set based on the measured RSRP, and an ID of the determined reference signal, which is not successfully received,
wherein precoding for the UE is determined based on the information on the at least part of the first reference signal set, and
wherein interference information on the UE is determined based on the information on the at least part of the second reference signal set.

2. The method of claim 1, wherein the first reference signal set is composed of reference signals of the BS, and
wherein the second reference signal set is composed of reference signals of a neighboring BS adjacent to the BS.

3. The method of claim 2, wherein different precoding is applied to each of the reference signals in the first reference signal set such that each of the reference signals in the first reference signal set has a different incidence angle in a vertical direction.

4. The method of claim 1, wherein the information on the at least part of the first reference signal set includes an ID(s) of at least one reference signal having RSRP equal to or greater than a first threshold value in the first reference signal set, and
wherein the information on the at least part of the second reference signal set includes an ID(s) of at least one reference signal having RSRP equal to or greater than a second threshold value in the second reference signal set.

5. The method of claim 4, wherein the information on the at least part of the first reference signal set further includes RSRP for the at least one reference signal having the RSRP equal to or greater than the first threshold value in the first reference signal set, and
wherein the information on the at least part of the second reference signal set further includes RSRP for the at least one reference signal having the RSRP equal to or greater than the second threshold value in the second reference signal set.

6. The method of claim 1, wherein the information on the at least part of the first reference signal set includes an ID(s) of at least one reference signal having RSRP equal to or greater than a first threshold value in the first reference signal set, and
wherein the information on the at least part of the second reference signal set includes an ID(s) of at least one reference signal having RSRP equal to or greater than a second threshold value in the second reference signal set.

7. The method of claim 6, wherein a time period for measuring RSRP for each of a plurality of reference signals in the first reference signal set is longer than that for measuring RSRP for each of a plurality of reference signals in the second reference signal set.

8. A user equipment (UE) in wireless communication using a two-dimensional active antenna system (2D-AAS) including multiple antennas, the UE comprising:
a transceiver configured to transmit and receive signals; and
a processor configured to:
control the transceiver to receive, from a base station (BS), a reference signal configuration including identifiers (IDs) of a plurality of reference signals included in a first reference signal set and a second reference signal set,
control the transceiver to receive, from the BS, the plurality of reference signals where a plurality of precoding is applied respectively,
determine a reference signal that is not successfully received based on the reference signals configuration,
measure reference signal received power (RSRP) for each of the plurality of reference signals, and
control the transceiver to transmit, to the BS, information on at least part of the first reference signal set and information on at least part of the second reference signal set based on the measured RSRP, and an ID of the determined reference signal, which is not successfully received, wherein precoding for the UE is determined based on the information on the at least part of the first reference signal set, and wherein interference information on the UE is determined based on the information on the at least part of the second reference signal set.

9. The UE of claim 8, wherein the first reference signal set is composed of reference signals of the BS, and wherein the second reference signal set is composed of reference signals of a neighboring BS adjacent to the BS.

10. The UE of claim 9, wherein different precoding is applied to each of the reference signals in the first reference signal set such that each of the reference signals in the first reference signal set has a different incidence angle in a vertical direction.

11. The UE of claim 8, wherein the information on the at least part of the first reference signal set includes an ID(s) of at least one reference signal having RSRP equal to or greater than a first threshold value in the first reference signal set, and wherein the information on the at least part of the second reference signal set includes an ID(s) of at least one reference signal having RSRP equal to or greater than a second threshold value in the second reference signal set.

* * * * *